(12) United States Patent
Patel et al.

(10) Patent No.: US 8,976,792 B2
(45) Date of Patent: Mar. 10, 2015

(54) OTV SCALING: SITE VIRTUAL MAC ADDRESS

(71) Applicant: Cisco Technology, Inc., San Jose, CA (US)

(72) Inventors: Jaimin Pankajkumar Patel, Foster City, CA (US); Tejas Kokje, Milpitas, CA (US); Ankur Goyal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 13/664,905

(22) Filed: Oct. 31, 2012

(65) Prior Publication Data

US 2014/0119372 A1    May 1, 2014

(51) Int. Cl.
*H04L 12/28* (2006.01)
(52) U.S. Cl.
USPC .......................................................... 370/392
(58) Field of Classification Search
None
See application file for complete search history.

(56) References Cited

U.S. PATENT DOCUMENTS

2002/0161918 A1* 10/2002 Asano et al. ................. 709/238
2011/0317703 A1* 12/2011 Dunbar et al. ............... 370/392

FOREIGN PATENT DOCUMENTS

WO    2009/018127 A1    2/2009

OTHER PUBLICATIONS

International Search Report for PCT/US2013/066684, Feb. 17, 2014.

\* cited by examiner

*Primary Examiner* — John Blanton
(74) *Attorney, Agent, or Firm* — Patterson + Sheridan, LLP

(57) ABSTRACT

Techniques for providing an extended layer 2 network. Embodiments receive, at a first network device in a first layer 2 network within the extended layer 2 network, a data packet specifying a destination Media Access Control (MAC) address. Upon determining that the destination MAC address is a site virtual MAC (S-VMAC) address, the data packet is forwarded to a second network device in a second layer 2 network within the extended layer 2 network and associated with the S-VMAC address, where the second network device is configured to determine a second destination MAC address for the data packet based on an Internet Protocol (IP) address specified in the data packet, and is further configured to forward the data packet to a destination device associated with the determined second destination MAC address.

18 Claims, 6 Drawing Sheets

OTV SCALING: SITE VIRTUAL MAC ADDRESS

TECHNICAL FIELD

Embodiments presented in this disclosure generally relate to extending layer 2 connectivity across multiple sites, and more specifically, to techniques for using a site virtual MAC address for routing layer 2 traffic to hosts located at remote sites.

BACKGROUND

The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

Generally, routers can be configured to forward packets from one network to another. For instance, a router may receive a packet, inspect the IP address in the packet's header, and compare the IP address to route information stored in the router's internal routing table to determine what to do with the packet. For example, the router could determine a destination for the packet based on information in the router's internal routing table and could forward the packet on towards the destination. As the packet is switched from router to router, its IP address may remain the same, but its MAC address may be updated to the next router interface along the path.

Overlay Transport Virtualization (OTV) provides a solution to extend layer 2 connectivity across different sites using an existing layer 3 network. With OTV, layer 2 extensions across multiple data centers is achieved by configuring one or more OTV edge devices at each of the data centers to extend a set of virtual local area networks (VLANs) across the multiple data centers. By doing so, remote-site MAC addresses can be installed on the edge devices, such that hosts within a first one of the data centers can access hosts within the other data centers using layer 2 communications. As a result, these techniques can extend layer 2 connectivity across multiple different sites.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

One embodiment provides a method of providing an extended layer 2 network. The method includes receiving, at a first network device in a first layer 2 network within the extended layer 2 network, a data packet specifying a destination Media Access Control (MAC) address. The method further includes, upon determining that the destination MAC address is a site virtual MAC (S-VMAC) address, forwarding the data packet to a second network device in a second layer 2 network within the extended layer 2 network and associated with the S-VMAC address, wherein the second network device is configured to determine a second destination MAC address for the data packet based on an Internet Protocol (IP) address specified in the data packet, and is further configured to forward the data packet to a destination device associated with the determined second destination MAC address.

Example Embodiments

One challenge for layer 2 networks extended across multiple data centers using OTV is controlling the size of MAC address tables on the various edge devices. That is, in a traditional network extended using OTV, an edge device at a first one of the data centers may need to be configured with the MAC addresses for each of the hosts at each of the other data centers. These MAC address tables may quickly grow to be prohibitively large as the layer 2 extended network grows. As a result, the total size of the extended network may be limited by the maximum size of the edge devices' MAC address tables. These limitations may be more pronounced in system on chip (SOC) network devices, where resources such as system memory are more limited.

Figure 1:
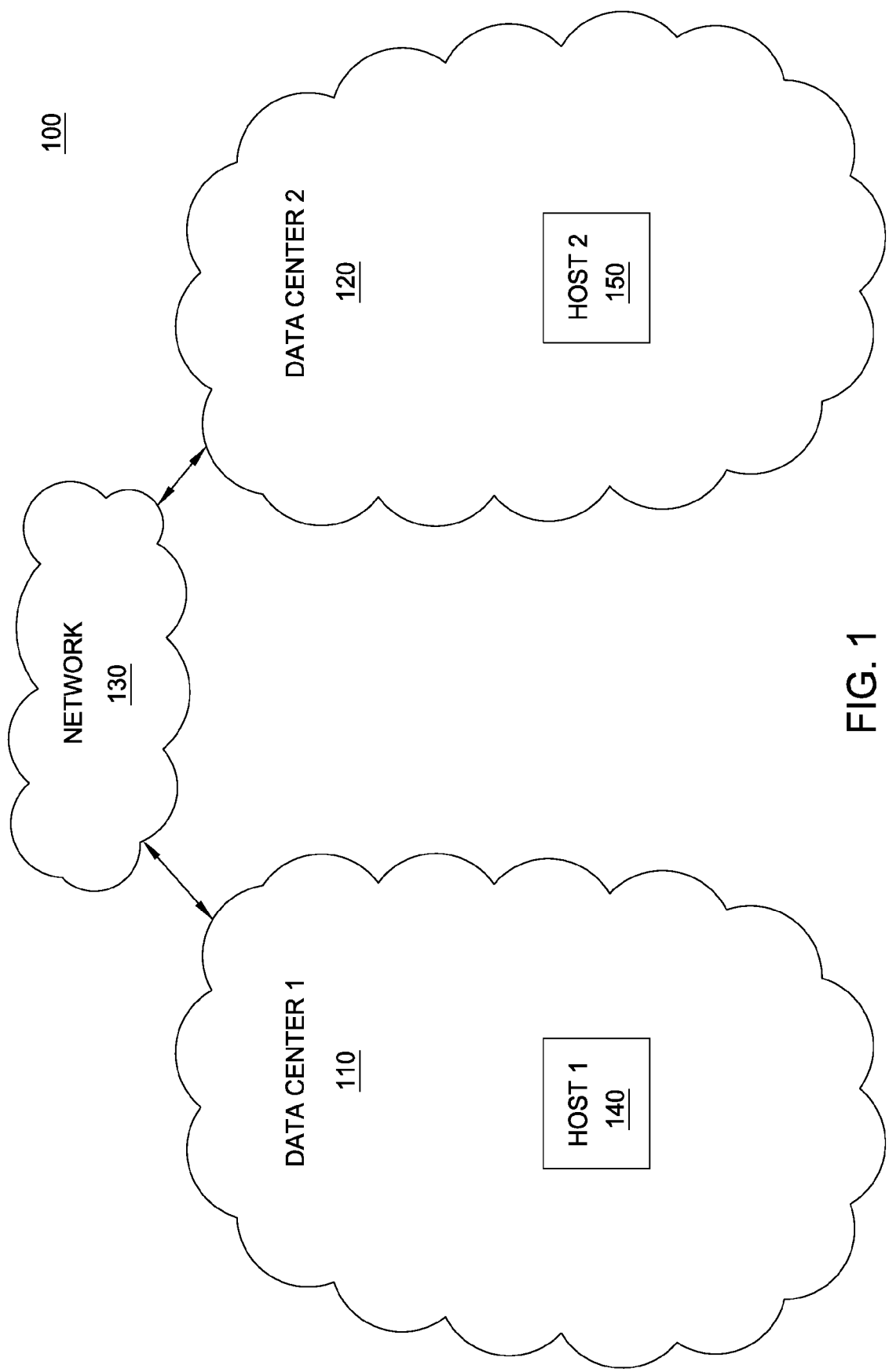
FIG. 1 illustrates a layer 2 extended network, according to one embodiment described herein.

An example of this is shown in FIG. 1, which illustrates a layer 2 extended network, according to one embodiment described herein. As shown, the system 100 includes a first data center 110 and a second data center 120, interconnected via an overlay network 130. Here, each of the data centers 110, 120 may maintain a separate layer 2 network, and these layer 2 networks can be logically combined into an extended layer 2 network through the use of OTV. By doing so, host 1 140 within the first data center's 110 layer 2 network may send layer 2 network traffic to host 2 150 within the second data center's 120 layer 2 network. That is, an edge device within the first data center's 110 network could be configured with a MAC address table that specifies the MAC address of host 1 as well as the MAC address of host 2. Upon receiving a data packet destined for the MAC address of host 2, the edge device could transmit the data packet over the overlay network 130 to an edge device for the second data center 120, which could then route the data packet on to host 2. While such a solution may be adequate for small scale extended networks containing a relatively small number of remote hosts, the MAC address tables on the edge devices can grow prohibitively large when dealing with a larger number of remote hosts.

As such, embodiments include techniques for providing an extended layer 2 network. Such an extended network could span, for instance, multiple data centers connected via a layer 2 data center interconnect. A first network edge device in a first layer 2 network may receive a data packet specifying a destination Media Access Control (MAC) address. Logic on the first network edge device may then determine whether the destination MAC address is a site virtual MAC (S-VMAC) address. Generally, an S-VMAC address is a logical identifier assigned to each layer 2 network in a given OTV site or to an entire OTV site within the extended layer 2 network. For example, a first data center could be assigned an S-VMAC address of "S1-VMAC" and a second data center could be assigned an S-VMAC address of "S2-VMAC".

Additionally, a MAC address table on each of the network edge devices within the extended layer 2 network could be preconfigured with information characterizing these S-VMAC addresses and logic configured to handle data packets directed to these S-VMAC addresses. For instance, returning to the present example, logic on the first network edge device could access a MAC address table on the first network edge device and could determine that the destination MAC address specified by the data packet is an S-VMAC address associated with a second network device in a second layer 2 network within the extended layer 2 network. Based on this determination, the logic within the first network edge device could forward the data packet to the second network device associated with the S-VMAC address.

Upon receiving the data packet from the first network device, the second network device could determine a destination media access control (MAC) address associated with the destination IP address. For instance, logic on the second network device could access an IP address to MAC address binding table (e.g., an adjacency table) on the second network device to determine a destination MAC address associated with the destination IP address. Once the destination MAC address is determined, the logic on the second network device could forward the data packet to a destination device within the second layer 2 network associated with the destination MAC address.

Advantageously, doing so allows the edge devices within the extended layer 2 network to maintain a single S-VMAC address for each of the remote edge devices within the extended layer 2 network. That is, as discussed above, edge devices in traditional OTV-enabled networks maintain a separate MAC address in their respective MAC address table for each individual host within each remote layer 2 network. This, in turn, can cause these MAC address tables to grow prohibitively large and may effectively limit the total size of the extended layer 2 network. By allowing the edge devices to maintain only a single S-VMAC address for each of the remote edge devices, embodiments make more efficient use of the MAC address tables on the edge devices and thus may provide a much larger extended layer 2 network than traditional solutions.

Figure 2:
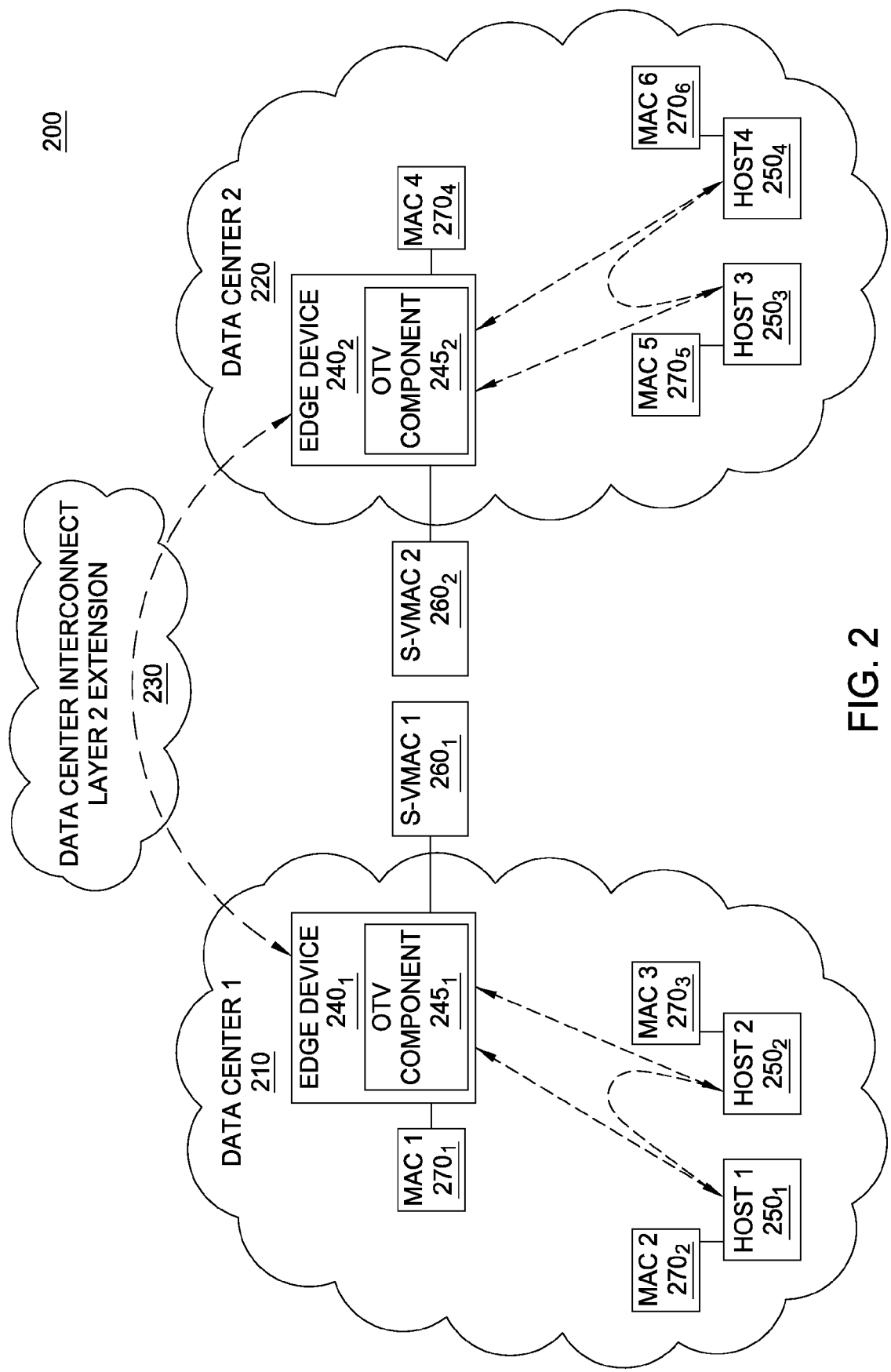
FIG. 2 illustrates a layer 2 extended network configured with an OTV component, according to one embodiment described herein.

An example of a system configured to use S-VMAC addresses is shown in FIG. 2, which illustrates a layer 2 extended network configured with an OTV component, according to one embodiment described herein. As shown, the system 200 includes a first data center network 210 and a second data center network 220 interconnected via a data center interconnect (DCI) layer 2 extension network 230. As shown, the first data center network 210 contains an edge network device $240_1$ configured with an OTV component $245_1$, and the second data center network 220 contains an edge network device $240_2$ configured with an OTV component $245_2$. Additionally, the first data center network 210 includes hosts $250_{1-2}$ and the second data center network 220 includes hosts $250_{3-4}$. The DCI layer 2 extension network 230 could be, for instance, an existing service provider layer 3 network. More generally, however, it is contemplated that any type of network connecting the data centers 210, 220 could be used, consistent with the embodiments described herein.

In the depicted embodiment, each of the hosts $250_{1-4}$ and the edge devices $240_{1-2}$ are configured with a respective MAC address $270_{1-6}$. As such, for layer 2 communications within the first data center network 210, the hosts $250_{1-2}$ and the edge device $240_1$ may communicate with one another using the MAC addresses $270_{1-3}$ (and other devices within the first data center network 210 using their respective MAC addresses). For instance, the host $250_1$ could transmit an ARP request requesting the MAC address associated with a first IP address. Upon receiving the ARP request, the host $250_2$ could return the MAC address $270_3$ in response to the ARP request. The host $250_1$ could then transmit layer 2 traffic to the host $250_2$ by addressing the traffic to the MAC address $270_3$. Layer 2 communications within the second data center network 220 may be handled in a similar fashion.

Additionally, the OTV components $245_{1-2}$ may be configured to handle layer 2 communications over the extended layer 2 network using the S-VMAC addresses $260_{1-2}$. That is, the OTV component $245_1$ could be configured to manage layer 2 communications going to and coming from the second data center network 220 over the DCI layer 2 extension network 230, and the OTV components $245_2$ could be configured to manage layer 2 communications going to and coming from the first data center network 210 over the DCI layer 2 extension network 230. In one embodiment, the OTV components $245_{1-2}$ are preconfigured with data assigning the S-VMAC addresses $260_{1-2}$ to the edge devices $240_{1-2}$. In a particular embodiment, one of more of the OTV components $245_{1-2}$ is configured to dynamically assign the S-VMAC addresses $260_{1-2}$ to the edge devices $240_{1-2}$.

Generally, each of the OTV components $245_{1-2}$ is configured to forward layer 2 traffic to its respective remote network 210, 220 over the DCI layer 2 extension network 230 based on the assigned S-VMAC addresses $260_{1-2}$. For instance, the host $250_1$ could transmit an ARP request to the edge device $240_1$, requesting the MAC address associated with a particular IP address. The OTV component $245_1$ on the edge device $240_1$ could determine that the particular IP address is associated with a host located within the second data center network 220. In making this determination, the OTV component $245_1$ could reference an IP-to-MAC address binding table stored on the edge device $240_1$. An example of such a table is shown below in Table 1.

TABLE 1

| Data Center 1 Hardware IP-to-MAC Address Binding Table | |
|---|---|
| IP Address | MAC Address |
| HOST1-IP | HOST1-MAC |
| HOST2-IP | HOST2-MAC |
| HOST3-IP | S2-VMAC |
| HOST4-IP | S2-VMAC |

Thus, in the present example, the OTV component $245_1$ could determine that the second IP address (e.g., HOST3-IP, which represents an IP address corresponding to the host $250_3$) corresponds to the destination MAC address "S2-VMAC". Upon determining that the second IP address is associated with a remote host, the OTV component $245_1$ could return the address "S2-VMAC" (i.e., the S-VMAC address $260_2$ associated with the second data center network 220) to the host $250_1$ in response to the ARP request. Logic on the host $250_1$ could then update its local ARP cache with the returned S-VMAC address $260_2$ corresponding to the particular IP address.

At some later point in time, the host $250_1$ could generate layer 2 traffic directed to the address "S2-VMAC", based on the host's $250_1$ local ARP cache. Upon receiving such layer 2 traffic, the OTV component $245_1$ could reference a MAC address table to determine how to properly switch the traffic. An example of such a table is shown below in Table 2.

TABLE 2

Data Center 1 Hardware MAC Address Table

| VLAN | Destination MAC Address | Destination Interface |
|---|---|---|
| 10 | HOST1-MAC | Eth1/5 |
| 11 | HOST2-MAC | Eth1/5 |
| 10 | S2-VMAC | Overlay |
| 11 | S2-VMAC | Overlay |

Here, upon receiving network frames from the host $250_1$ addressed to the address "S2-VMAC" (i.e., S-VMAC address $260_2$), the OTV component $245_1$ could reference the MAC address table to determine that frames to this S-VMAC address for both VLANs "10" and "11" are sent over the "Overlay" network (i.e., the DCI layer 2 extension network 230). The OTV component $245_1$ could then forward these network frames to the OTV component $245_2$ on the edge device $240_2$, over the DCI layer 2 extension network 230.

Upon receiving the network frames from the OTV component $245_1$, the OTV component $245_2$ could access an IP-to-MAC address binding table (e.g., an adjacency table) on the edge device $240_2$ to determine a MAC address to forward the network frames to. An example of such a table is shown below in Table 3.

TABLE 3

Data Center 2 Hardware IP-to-MAC Address Binding Table

| IP Address | MAC Address |
|---|---|
| HOST3-IP | HOST3-MAC |
| HOST4-IP | HOST4-MAC |

Here, the OTV component $245_2$ could analyze the forwarded data packets and could determine that the destination IP address specified in the forwarded data packets is "HOST3-IP", and that the IP-to-MAC address binding table indicates that this IP address corresponds to host $250_3$ having MAC address $270_5$ (i.e., "HOST3-MAC") on the second data center network 220. The OTV component $245_2$ could then alter the destination MAC address specified in the forwarded data packets by replacing the S-VMAC address $260_2$ with the MAC address $270_5$ for the host $250_3$. Additionally, the OTV component $245_2$ could access a MAC address table on the edge device $240_2$ to determine how to switch the incoming traffic to the MAC address "HOST3-MAC". An example of such a MAC address table is shown below in Table 4.

TABLE 4

Data Center 2 MAC Address Table

| VLAN | Destination MAC Address | Destination Interface |
|---|---|---|
| 10 | HOST3-MAC | Eth2/10 |
| 11 | HOST4-MAC | Eth2/10 |
| 10 | S1-VMAC | Overlay |
| 11 | S1-VMAC | Overlay |

In this example, the OTV component $245_2$ could access the MAC address table shown in Table 3 and could determine that traffic to the MAC address "HOST3-MAC" should be sent on VLAN 10 and using the interface "Eth2/10". The OTV component $245_2$ could then forward the altered data packets on to the host $250_3$.

Advantageously, doing so provides an extended layer 2 network encompassing both the first data center network 210 and the second data center network 220. Moreover, the aforementioned techniques provide the extended layer 2 network in a more efficient fashion than conventional OTV techniques. That is, as the edge devices $240_{1-2}$ in the depicted example maintain an S-VMAC address for each of the data centers within the extended layer 2 network, as opposed to a separate MAC address for each and every remote host within the extended layer 2 network, the size of these MAC address tables are not directly based on the total number of hosts within the extended layer 2 network. As such, through the use of the S-VMAC addresses for each separate site network (e.g., data center networks 210 and 220), the extended layer 2 network can become much larger than conventional extended layer 2 networks before the MAC address tables on the edge devices $240_{1-2}$ become prohibitively large. These advantages are particularly pronounced, for instance, in system on a chip (SOC) edge devices, where memory resources may be heavily constrained.

Additionally, although the above example involves network traffic flowing from the first data center network 210 to the second data center network 220, such an example is for illustrative purposes only. Generally, layer 2 communications originating in the second data center network 220 and destined for remote hosts in the first data center network 210 may be handled in a similar fashion. Moreover, although FIG. 2 shows two data center networks 210, 220 interconnected via the DCI layer 2 extension network 230, it is broadly contemplated that any number of different networks can be connected together under an extended layer 2 network using the techniques described above.

Figure 3:
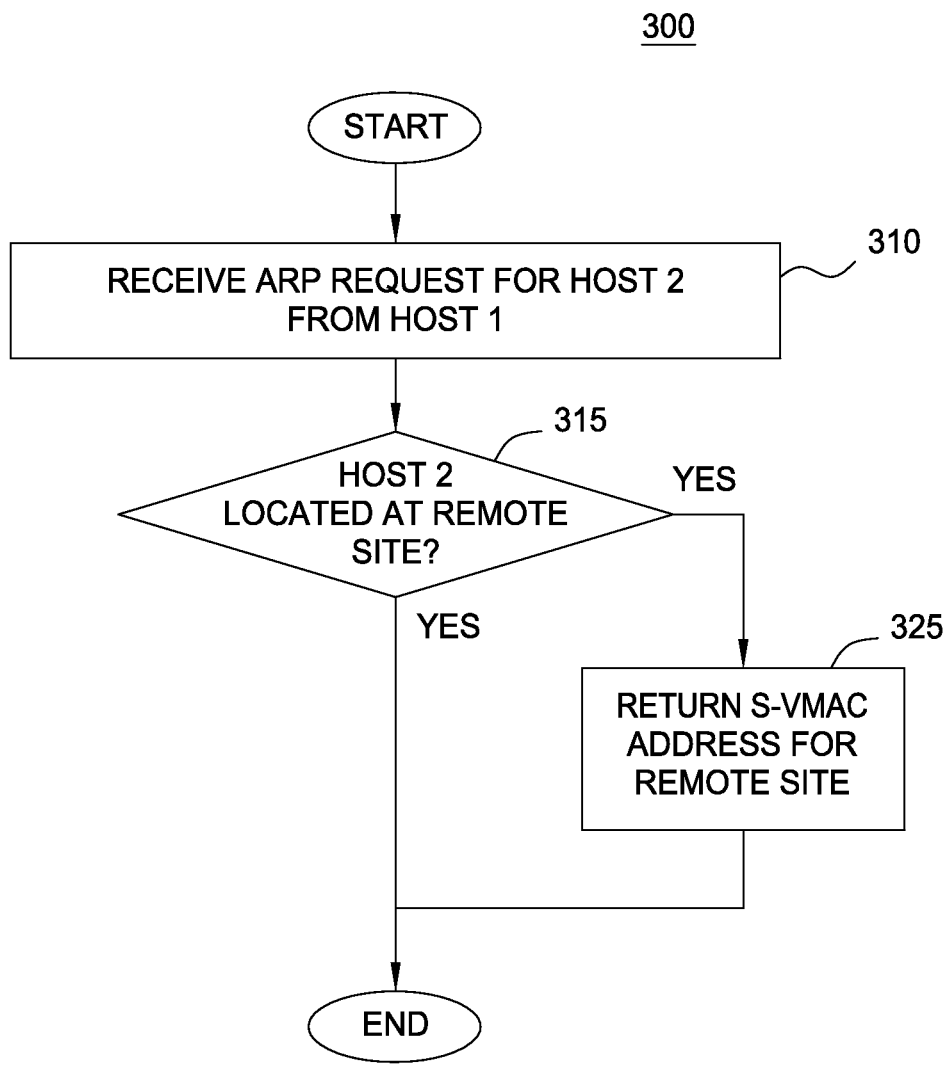
FIG. 3 is a flow diagram illustrating a method for returning a MAC address for a host, according to one embodiment described herein.

FIG. 3 is a flow diagram illustrating a method for returning a MAC address for a host, according to one embodiment described herein. As shown, the method 300 begins at block 310, where an OTV component 245 on an edge device 240 receives an ARP request from a first host and specifying an IP address associated with a second host. Upon receiving the ARP request, the OTV component 245 determines whether the second host associated with the IP address is located at a remote site (block 315). That is, the OTV component 245 determines if the second host is located within a different physical layer 2 network than the edge device 245. For example, if the OTV component 245 is located on an edge device 240 at a first data center and determines that the second host is located on the network for a second data center, the OTV component 245 could determine that the second host is located at a remote site.

If the OTV component 245 determines that the second host is located at a remote site, the OTV component 245 determines an S-VMAC address associated with the remote site and returns the determined S-VMAC address in response to the ARP request (block 325). On the other hand, if the second host is located at the local site, the method 300 ends. In such a scenario, the second host could return its MAC address in response to the ARP request. Once the OTV component 245 returns the S-VMAC address, the method 300 ends.

In response to receiving the MAC address or the S-VMAC address, logic on the first host could then update an ARP cache on the first host with the received address. For example, if the OTV component 245 returns an S-VMAC address for the second host in response to the ARP request, logic on the first host could update its local ARP cache to create an association between the IP address and the returned S-VMAC address. If, at some subsequent point in time, the first host wishes to transmit a network frame to the second host, the first host could then specify a destination MAC address within the network frame as the returned S-VMAC address.

Figure 4:
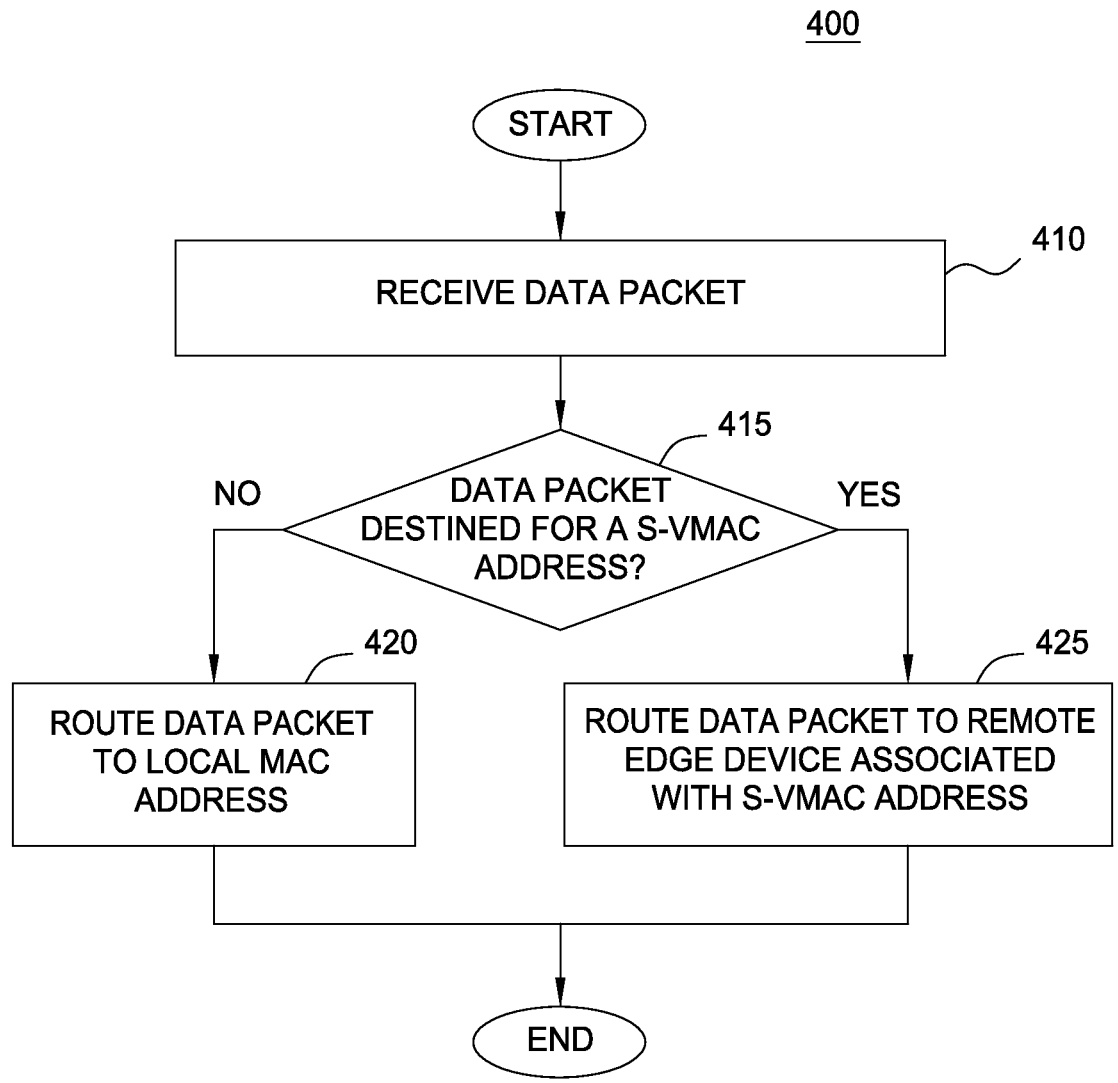
FIG. 4 is a flow diagram illustrating a method for routing a data packet, according to one embodiment described herein.

FIG. 4 is a flow diagram illustrating a method for routing a data packet, according to one embodiment described herein. As shown, the method 400 begins at block 410, where the OTV component 245 receives a data packet from the first host. Upon receiving the data packet, the OTV component 245 analyzes the data packet and determines a destination MAC address for the data packet. Additionally, the OTV component 245 determines whether the destination MAC address is an S-VMAC address (block 415).

If the OTV component 245 determines that the destination MAC address is an S-VMAC address, the OTV component 245 determines a remote device to route the data packet to and forward the data packet on to the remote device (block 425). For example, the OTV component 245 could access a MAC address table on the edge device 240 and could determine that network traffic for a particular VLAN and addressed to S-VMAC address "S2-VMAC" should be sent over the "Overlay" interface (e.g., an existing service provider layer 3 network connecting two or more data centers, such as the DCI interconnect network 230 shown in FIG. 2) to a remote network device having a particular IP address, and could forward the network traffic on accordingly. If the OTV component 245 determines that the destination MAC address specified in the data packet is not an S-VMAC address, the OTV component 245 forward the data packet on to the local device associated with the destination MAC address (block 420). Once the OTV component 245 routes the packet to the remote edge device or the local device, the method 400 ends.

Figure 5:
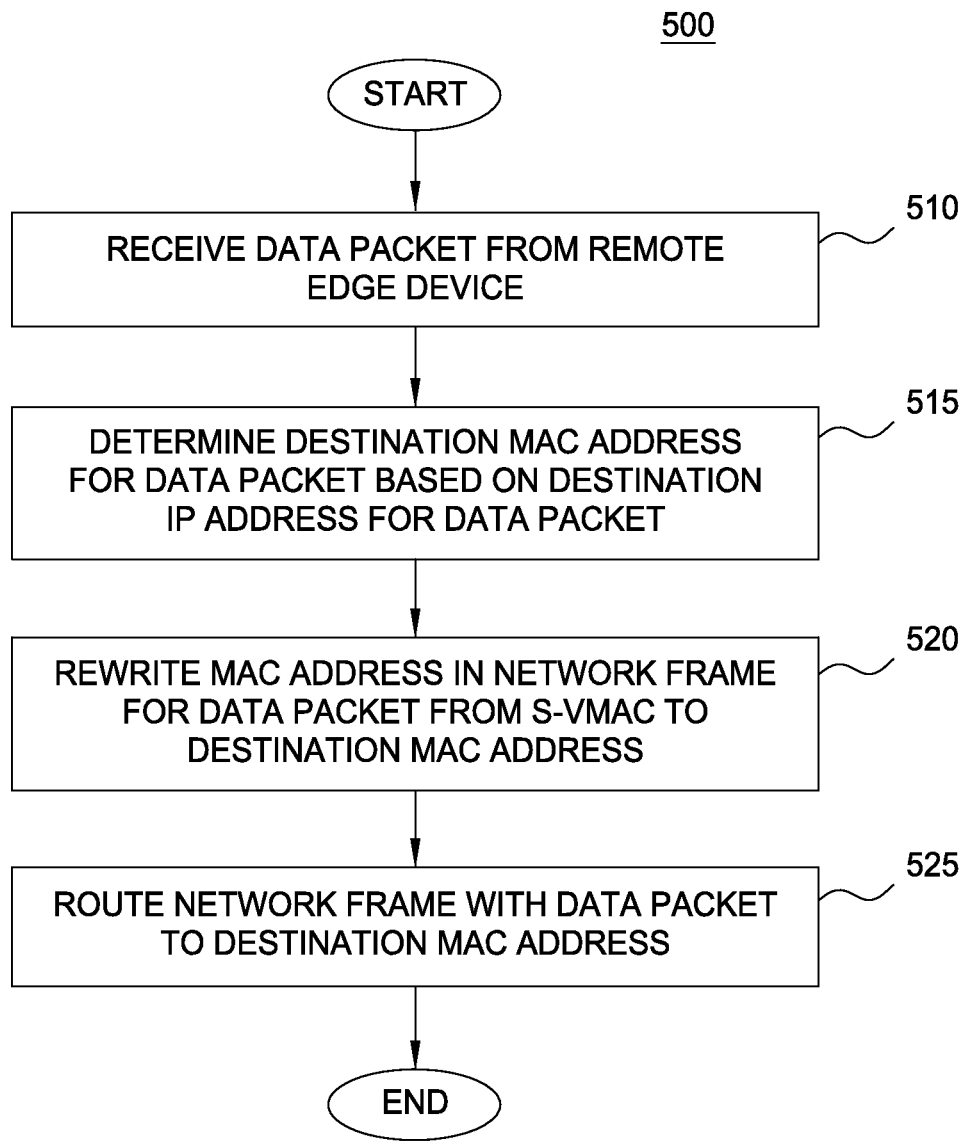
FIG. 5 is a flow diagram illustrating a method for routing a data packet received from a remote site, according to one embodiment described herein.

Upon receiving a data packet addressed to an S-VMAC address from a remote edge device, the OTV component 245 may determine a local MAC address associated with the data packet and forward the data packet on to the local MAC address. An example of this is shown in FIG. 5, which is a flow diagram illustrating a method for routing a data packet received from a remote site, according to one embodiment described herein. As shown, the method 500 begins at block 510, where the OTV component 245 on a first edge device receives a data packet from a remote edge device. Here, the received packet is addressed to an S-VMAC address associated with the first edge device. For example, the data packet could be forwarded using the method 400 described above.

Upon receiving the data packet, the OTV component 245 analyzes the data packet to determine a destination IP address for the data packet. Based on this destination IP address, the OTV component 245 determines a destination MAC address for the data packet (block 515). For example, the OTV component 245 could query an IP-to-MAC address binding table (e.g., an adjacency table) on the first edge device to determine a destination MAC address that corresponds to the destination IP address for the data packet. Upon determining the destination MAC address, the OTV component 245 rewrites the MAC address in the network frame for the data packet to replace the S-VMAC destination address with the determined destination MAC address (block 520). Additionally, the OTV component 245 could query a MAC address table on the first edge device to determine how to transmit network traffic to the determined destination MAC address (e.g., which interface to use, which VLAN to use, etc.). The OTV component 245 then transmits the altered network frame to the destination MAC address (block 525), and the method 500 ends. Advantageously, doing so provides an extended layer 2 network while minimizing the size of the MAC address tables maintained by the various edge devices within the extended network.

Figure 6:
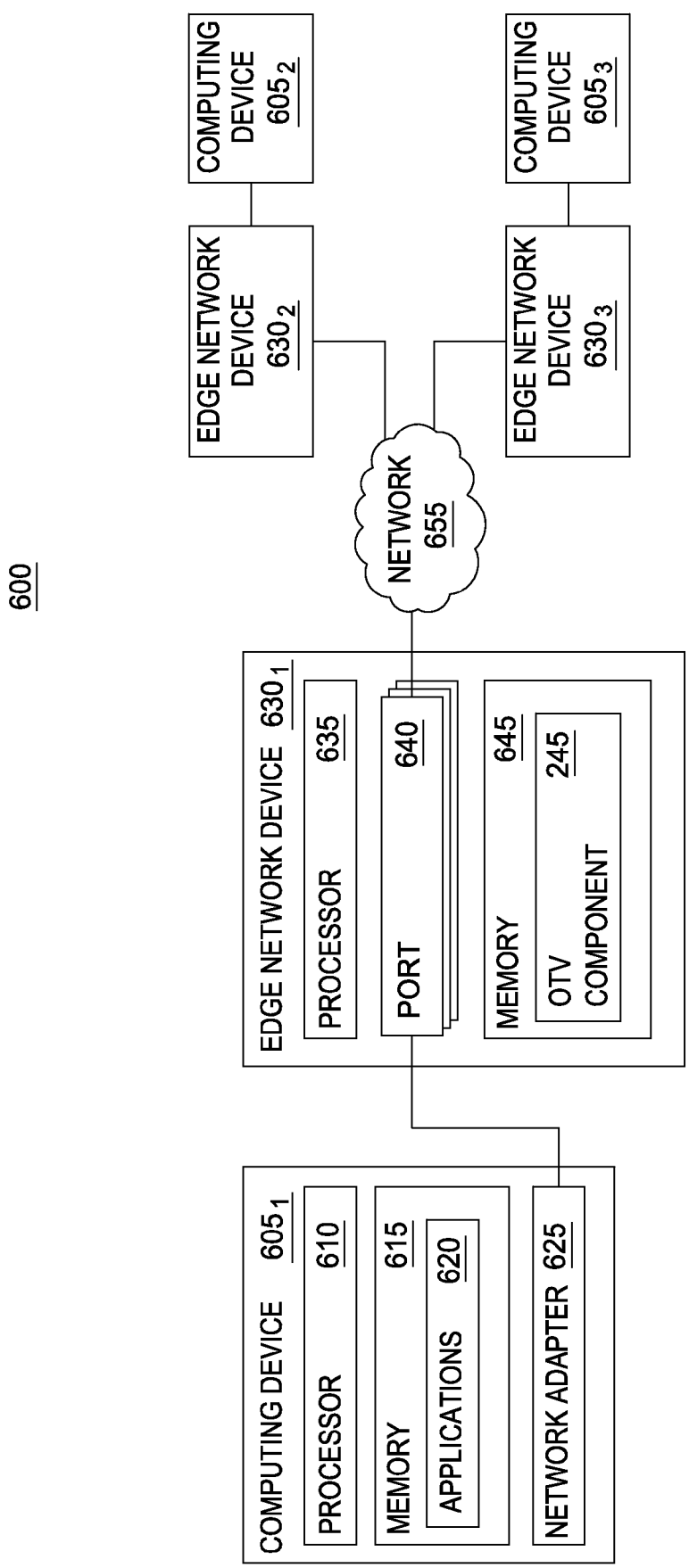
FIG. 6 is a block diagram illustrating a layer 2 extended network configured with an OTV component, according to one embodiment described herein.

FIG. 6 illustrates a communication network, according to one embodiment described herein. Communication network 600 includes a plurality of computing devices 605 and edge network devices 630. Each computing device (or end device or host) $605_{1-3}$ includes a processor 610, memory 615, and network adapter 625. The processor 610 may be any processing element capable of performing the functions described herein. The processor 610 represents single processor, multiple processors, a processor with multiple cores, and combinations thereof. The memory 615 may be either volatile or non-volatile memory and include, RAM, flash, cache, disk drives and the like. Although shown as a single entity, the memory 615 may be divided into different memory storage element such as RAM and one or more hard disk drives.

The network adapter 625 facilitates communication between the computing devices 605 and the edge network devices 630. The network adapter may use either wired or wireless communication techniques to transmit data to, and receive data from, the edge network devices 630. For example, the applications 620 may use the network adapter to enable communication to other computer devices $605_{2-3}$.

The edge network devices 630 include a processor 635, communication ports 640, and memory 645. The processor 635 may be any processing element capable of performing the functions described herein. The processor 635 represents a single processor, multiple processors, a processor with multiple cores, and combinations thereof. The memory 645 may be either volatile or non-volatile memory and include, RAM, flash, cache, disk drives and the like. The memory 645 contains an OTV component 245. As discussed above, the OTV components 245 within the edge network devices $630_{1-3}$ are generally configured to provide an efficient extended layer 2 network through the use of S-VMAC addresses. Moreover, the memory 645 could also contain network logic—e.g., a content addressable memory—for forwarding data in the communication network 600. The edge network devices 630 may also include a control plane for configuring and managing the forwarding logic.

An edge network device 630 may be coupled to one or more computing devices 605, other network devices, or a combination of both using the ports 640. For example, the network 655 represents one or more network devices that forward data plane traffic from one end device to another. The network may be a WAN (e.g., the Internet) or a LAN. In addition to forwarding data plane traffic, the network 655 may forward management plane or control plane traffic between the network devices 630 or between the network devices 630 and the computing devices 605. In one embodiment, each of the edge network devices $630_{1-3}$ resides at a different site (e.g., a data center) and the network 655 represents a DCI interconnect network (e.g., an existing service provider layer 3 network).

As discussed above, the OTV components 245 are generally configured to provide an extended layer 2 network, in which the connected computing devices (e.g., computing device $605_1$ for the edge network device $630_1$) can transmit layer 2 network traffic to remote computing devices (e.g., computing device $605_2$) using an S-VMAC address. For instance, the OTV component 245 within the edge network device $630_1$ could receive a data packet specifying a first destination MAC address. Upon determining that the destination MAC address is an S-VMAC address, the OTV component 245 could forward the data packet to a second network device (e.g., the edge network device $630_2$ over the network 655). For instance, the OTV component 245 could access a MAC address table on the edge network device $630_1$ and could determine that data packets addressed to the particular S-VMAC address should be routed over the network 655 and to an IP address associated with the edge network device $630_2$.

Upon receiving the forwarded data packet, the OTV component 245 on the edge network device $630_2$ could determine a destination MAC address associated with a destination IP address specified in the data packet. For instance, the OTV component 245 could access an ARP table on the edge network device $630_2$ to determine the destination MAC address associated with the specified destination IP address in the data packet. The OTV component 245 could then forwarding the data packet to a destination device associated with the destination MAC address. For example, assuming that the determined MAC address corresponds to the computing device $605_2$, the OTV component 245 could forward the data packet on to the computing device $605_2$. Advantageously, doing so provides an extended layer 2 network in which the computing devices $605_{1-3}$ can communicate with remote devices within the extended layer 2 network using layer 2 communications.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, an OTV component 245 could execute on an edge network device in a first data center for the cloud and could associate an S-VMAC address with another data center for the cloud. The OTV component 245 could return the S-VMAC address in response to ARP requests from hosts at the first data center that specify a destination IP address associated with a remote host located at the other data center for the cloud. Upon receiving network traffic specifying the S-VMAC address as a destination address, the OTV component 245 could forward the network traffic to a remote edge device at the other data center. An OTV component 245 on the remote edge device could determine a destination MAC address within the other data center based on the destination IP address specified in the data packet, and could forward the data packet on to the determined destination MAC address. Advantageously, doing so provides an extended layer 2 network for two or more data centers for the cloud which users can access from any computing system attached to a network connected to the cloud (e.g., the Internet).

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of providing an extended layer 2 network, comprising:

receiving, at a first network device in a first layer 2 network within the extended layer 2 network, a data packet specifying a destination Media Access Control (MAC) address; and upon accessing a MAC address table on the first network device to determine an interface corresponding to the S-VMAC address, forwarding the data packet using the determined interface to a second network device in a second layer 2 network and associated with the S-VMAC address, wherein all remote hosts within the second layer 2 network belonging to a first virtual local area network (VLAN) inclusive of the remote host are represented by a single entry within the MAC address table, wherein the second network device is configured to determine a second destination MAC address for the data packet based on an Internet Protocol (IP) address specified in the data packet, and is further configured to forward the data packet to a destination device associated with the determined second destination MAC address.

2. The method of claim 1, wherein the second network device is further configured to write the determined second destination MAC address to the network frame encapsulating the data packet, replacing the S-VMAC address within the data packet.

3. The method of claim 1, further comprising:
upon determining that the destination MAC address is not a site virtual MAC address, forwarding the data packet to a destination device associated with the destination MAC address.

4. The method of claim 1, further comprising:
receiving an address resolution protocol (ARP) request specifying the IP address;
determining that the IP address corresponds to a remote host within the second layer 2 network; and
responsive to the ARP request, returning the S-VMAC address associated with the second network device.

5. The method of claim 1, further comprising:
determining routing information for forwarding the data packet to the second network device by accessing the MAC address table on the first network device, wherein the routing information includes at least one of an interface identifier, an IP address associated with the second network device, and a VLAN identifier.

6. The method of claim 1, further comprising:
dynamically assigning the S-VMAC address to the second network device within the extended layer 2 network, wherein the S-VMAC address is a unique logical identifier for a physical layer 2 network that includes the second network device.

7. A network edge device in a first layer 2 network within an extended layer 2 network, comprising:
a processor; and
a memory containing a program that, when executed by the processor, performs an operation comprising:
receiving a data packet specifying a destination Media Access Control (MAC) address; and
upon accessing a MAC address table on network edge device to determine an interface corresponding to the S-VMAC address, forwarding the data packet using the determined interface to a second network device in a second layer 2 network within the extended layer 2 network and associated with the S-VMAC address, wherein all remote hosts within the second layer 2 network belonging to a first virtual local area network (VLAN) inclusive of the remote host are represented by a single entry within the MAC address table, wherein the second network device is configured to determine a second destination MAC address for the data packet based on an Internet Protocol (IP) address specified in the data packet, and is further configured to forward the data packet to a destination device associated with the determined second destination MAC address.

8. The network edge device of claim 7, wherein the second network device is further configured to write the determined second destination MAC address to the network frame encapsulating the data packet, replacing the S-VMAC address within the data packet.

9. The network edge device of claim 7, the operation further comprising:
upon determining that the destination MAC address is not a site virtual MAC address, forwarding the data packet to a destination device associated with the destination MAC address.

10. The network edge device of claim 7, the operation further comprising:
receiving an address resolution protocol (ARP) request specifying the IP address;
determining that the IP address corresponds to a remote host within the second layer 2 network; and
responsive to the ARP request, returning the S-VMAC address associated with the second network device.

11. The network edge device of claim 7, further comprising:
determining routing information for forwarding the data packet to the second network device by accessing the MAC address table on the first network device, wherein the routing information includes at least one of an interface identifier, an IP address associated with the second network device, and a VLAN identifier.

12. The network edge device of claim 7, the operation further comprising:
dynamically assigning the S-VMAC address to the second network device within the extended layer 2 network, wherein the S-VMAC address is a unique logical identifier for a physical layer 2 network that includes the second network device.

13. A non-transitory computer program product for providing an extended layer 2 network, comprising:
computer code that receives, at a first network device in a first layer 2 network within the extended layer 2 network, a data packet specifying a destination Media Access Control (MAC) address;
computer code that, upon accessing a MAC address table on the first network device to determine an interface corresponding to the S-VMAC address, forwards the data packet using the determined interface to a second network device in a second layer 2 network within the extended layer 2 network and associated with the S-VMAC address, wherein all remote hosts within the second layer 2 network belonging to a first virtual local area network (VLAN) inclusive of the remote host are represented by a single entry within the MAC address table, wherein the second network device is configured to determine a second destination MAC address for the data packet based on an Internet Protocol (IP) address specified in the data packet, and is further configured to forward the data packet to a destination device associated with the determined second destination MAC address; and
a computer-readable medium that stores the computer codes.

14. The non-transitory computer program product of claim 13, wherein the second network device is further configured to write the determined second destination MAC address to the network frame encapsulating the data packet, replacing the S-VMAC address within the data packet.

15. The non-transitory computer program product of claim 13, further comprising:
computer code that, upon determining that the destination MAC address is not a site virtual MAC address, forwards the data packet to a destination device associated with the destination MAC address.

16. The non-transitory computer program product of claim 13, further comprising:
   computer code that receives an address resolution protocol (ARP) request specifying the IP address;
   computer code that determines that the IP address corresponds to a remote host within the second layer 2 network; and
   computer code that, responsive to the ARP request, returns the S-VMAC address associated with the second network device.

17. The non-transitory computer program product of claim 13, further comprising:
   computer code that dynamically assigns the S-VMAC address to the second network device within the extended layer 2 network, wherein the S-VMAC address is a unique logical identifier for a physical layer 2 network that includes the second network device.

18. The non-transitory computer program product of claim 13, further comprising:
   determining routing information for forwarding the data packet to the second network device by accessing the MAC address table on the first network device, wherein the routing information includes at least one of an interface identifier, an IP address associated with the second network device, and a VLAN identifier.

* * * * *